Sept. 15, 1970 A. F. PODELL 3,529,265

RADIO FREQUENCY POWER DIVIDER

Filed Sept. 29, 1969 2 Sheets-Sheet 1

INVENTOR
ALLEN F. PODELL
BY
Kenway, Jenney & Hildreth
ATTORNEYS

RADIO FREQUENCY POWER DIVIDER

Filed Sept. 29, 1969 2 Sheets-Sheet 2

INVENTOR
ALLEN F. PODELL
BY
Kenway, Jenney & Hildreth
ATTORNEYS

United States Patent Office 3,529,265
Patented Sept. 15, 1970

3,529,265
RADIO FREQUENCY POWER DIVIDER
Allen F. Podell, Cambridge, Mass., assignor to Adams-Russell Co., Inc., Waltham, Mass., a corporation of Massachusetts
Filed Sept. 29, 1969, Ser. No. 861,980
Int. Cl. H01p 5/12
U.S. Cl. 333—9 9 Claims

ABSTRACT OF THE DISCLOSURE

An N way radio frequency power divider employing a set of N quarter wave length sections of transmission lines having their input ends connected in series across an input port. A second set of like transmission lines is connected to the first at the opposite ends from the input port, the grounded conductor of each of the first set of transmission lines is connected through an output load impedance equal in value to the impedance of the input port to one conductor of each of the second set. This conductor in the second set is also grounded at its unconnected end and forms with the conducting wall of the box for the circuit a shorted quarter wave line to produce compensation and increase bandwidth. The non-grounded conductors of the second set are connected at the input end to the non-grounded conductors of the first set and at the output end through terminating impedances to a floating junction.

FIELD OF THE INVENTION

This invention relates in general to power dividers and more particularly to a power divider operable with high isolation over at least one octave bandwidth.

PRIOR ART

In radio frequency networks there very often are requirements for multiple power dividers, that is for power dividers which receive an input signal and provide several, for example, six, output signals, each one sixth of the power of the input signal. In a number of such network requirements it is desirable to have the characteristic output impedance of each of the output channels equal to that of the impedance of the input port or channel which received the signal to be divided. It is also essential that the circuitry be characterized by high isolation and be operable over a reasonable bandwidth, typically one to two octaves. An acceptable standing wave ratio over this bandwidth would be less than 1.6:1. In the past a number of design approaches have been employed. These include cascading hybrid couplers, in order to get power division of four or eight, and a variety of quarter wave length transformer arrangements.

These latter include the use of quarter wave length sections of transmission line. In one such transmission line arrangement which provides for a division factor of three, three one quarter wave length transmission lines are arranged with their input ends connected in parallel across the input port terminals and each line is terminated in an output load equal to the input impedance, one conductor of each transmission line at the output end being grounded. This configuration has satisfactory isolation and standing wave ratio for only very narrow bandwidths. As the division factor is increased, this bandwidth further decreases and the isolation deteriorates.

SUMMARY OF THE INVENTION

In the present invention an input port of characteristic impedance $Z_1$ is connected across a number, N, of transmission lines arranged such that a serial combination of the input ends of the transmission lines is connected between the two terminals which form the input port. The number, N, of transmission lines is equal to the power division factor. Thus, if the power divider is to be a three way divider then there are three transmission lines. The transmission lines are each one quarter wave length long at the center frequency of the operating bandwidth and one conductor of each of the transmission lines is grounded at the end removed from the input port. The characteristic impedance of each of these transmission lines is selected according to the desired standing wave ratio versus frequency characteristic. For the case of a maximally flat response the input line characteristic impedance is set at $Z_1/\sqrt{N}$.

Each one of the transmission lines has connected to it at the end removed from the input port a second quarter wave length section of transmission line of the same characteristic impedance with one conductor of each of these second group of transmission lines connected at one end to the non-grounded conductor of the corresponding one of the first group of transmission lines, the other end of the conductor of the second transmission line being connected through a terminating impedance to a floating junction. The value of each of the terminating impedances will depend upon the load impedances, and the characteristic impedances of the transmission line sections, being selected, however, to provide both matching of the second group of transmission lines and isolation of the parts.

The other conductors of each of the second group of transmission lines each have one end connected through a load impedance, which is also selected to be $Z_1$, to ground and the other ends of these lines are connected directly to ground. The ground plane, or box containing the divider forms with each second conductor in this second group a shorted quarter wave length transmission line, which then appears across the load or output port impedance. If in a particular construction, the box is not a suitable conductor, other techniques for providing the shorted line sections may be employed.

Each of the transmission line sections connected directly to the input port have ferrite beads to provide proper isolation. The number of ferrite beads required may be reduced by connecting shorted quarter wave lines across the input ends of some of the first group of transmission lines. In an alternative configuration, some beads may be removed to create an input shunt.

A power divider constructed in accordance with the principles described may exhibit a VSWR of 1.1 over a bandwidth ratio of 3:1 for power dividers up to a division factor of 3. For power dividers at higher values of N, the bandwidth will decrease. The limitation of bandwidth experienced in these divider circuits occurs at frequencies below the center frequency because of an inherently capacitative characteristic, whereas the limitation in bandwidth at frequencies above the center frequency arise because, at these frequencies, the network appears inherently inductive. The shorted quarter wave length sections shunting the output loads tend to compensate for this effect since at increased frequencies they appear capacitative and at decreased frequencies they appear inductive.

DESCRIPTION OF A PREFERRED EMBODIMENT

Figure 1:
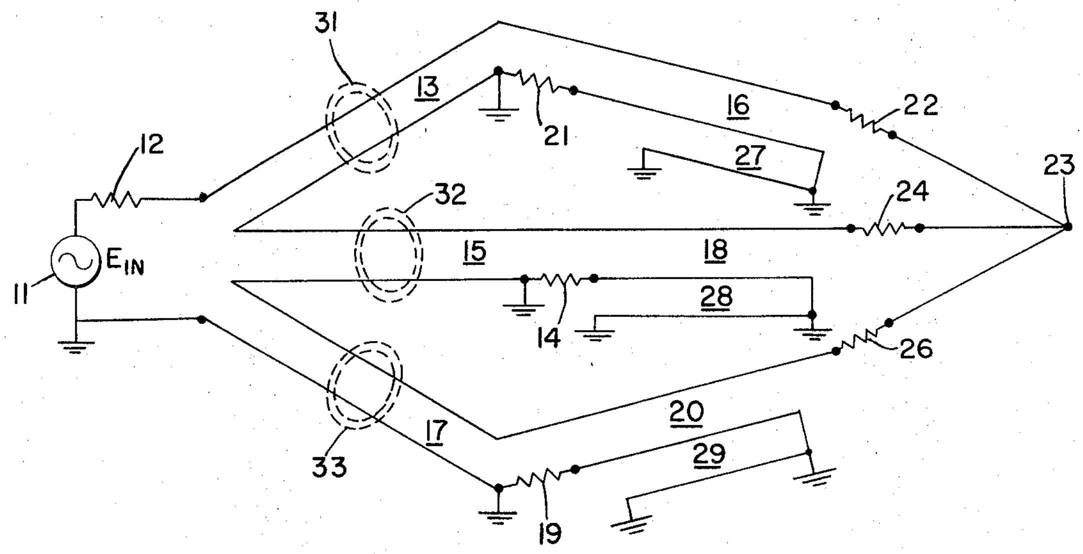
FIG. 1 is an illustration in schematic form of a three way power divider constructed in accordance with the principles of this invention.

With reference now to FIG. 1 there is illustrated a transmission line network which provides three way power division. At the input port a signal source 11 is shown in series with its internal impedance 12 generating an input signal $E_{in}$. Three lengths of transmission line, 13, 15 and 17 are connected across this input so that the input ends of these transmission lines are in series. Thus, transmission line 13 has one conductor connected directly to one terminal of the input port and its second conductor connected at the same end to a conductor of transmission line 15, the other conductor of transmission line 15 being connected to one conductor of transmission line 17 with the remaining conductor of transmission line 17 connected to ground. These transmission lines 13, 15 and 17 are each selected to be one quarter wave length long at the center frequency of the operating bandwidth of the divider. In one configuration the characteristic impedance of each one of these transmission sections is $Z_1/\sqrt{N}$, where $Z_1$ is the internal load impedance 12 of the signal source 11. A second set of three transmission lines 16, 18 and 20 are connected to the ends of transmission lines 13, 15 and 17 removed from the input port connections. In this particular configuration, the transmission lines in this second group are also quarter wave length sections of the same characteristic impedance as those in the first group.

The transmission line 16, 18 and 20 in this second group are each connected to a corresponding transmission line in the first group, the grounded conductors being interconnected through load impedance 21, 14 and 19 respectively. The impedances 21, 14 and 19 have a value $Z_1$ identical to that of the impedances 12, and these impedances serve as the output ports of the divider such that the applied signal $E_{in}$, appears symmetrically divided across each one of these output ports. Since the junctions between the first transmission line sections and the output impedances are grounded, the output may be taken directly across these impedances. Those conductances of transmission lines 16, 18 and 20 which are not connected to the output port impedances are connected at that same end directly to the non-grounded conductor of the corresponding one of the first set of transmission lines 13, 15 and 17. The other end of each of these non-grounded conductors in the second set of transmission lines is connected through a terminating impedance to a floating junction 23. Thus, transmission line 16, has one conductor connected through impedance 22 to the junction 23, while transmission line 18 has a conductor similarly connected through impedance 24 and transmission line 20 has has a conductor similarly connected through impedance 26. Impedances 22, 24 and 26 are chosen to have a value of $Z_1/N$. Since the junction 23 is floating and since the three transmission line channels are all symmetrical, then precisely equal amounts of current from an input signal $E_{in}$ at the input port are transmitted through impedances 22, 24 and 26 toward junction 23. Since this junction is floating there can be no net current and accordingly the currents through these resistors are equal to zero and the terminating impedances of each of these transmission line sections 16, 18 and 20 may be considered to be infinite. These sections are, then in effect, open end transmission line sections.

Each of the transmission lines 16, 18 and 20 is positioned at a controlled spacing from a conducting surface which is at ground potential and thereby forms with one of the conductors of these lines a third series of shortened transmission lines 27, 28 and 29. These latter transmission lines in conjunction with the open end lines 16, 18 and 20 provide compensation for the band limiting characteristics of the impedance transforming sections 13, 15 and 17 and therefore extend the bandwidth over which satisfactory standing wave ratios may be obtained. Most conveniently these surfaces may be formed of the walls of the box containing the entire circuit. As described in U.S. patent application Ser. No. 754,678 assigned to the assignee of this application ferrite beads 31, 32 and 33 are placed around the input line sections 13, 15 and 17 to permit one end of a conductor on each of these transmissions lines to be grounded with the input ends being connected as part of a serial combination across the input.

Figure 2:
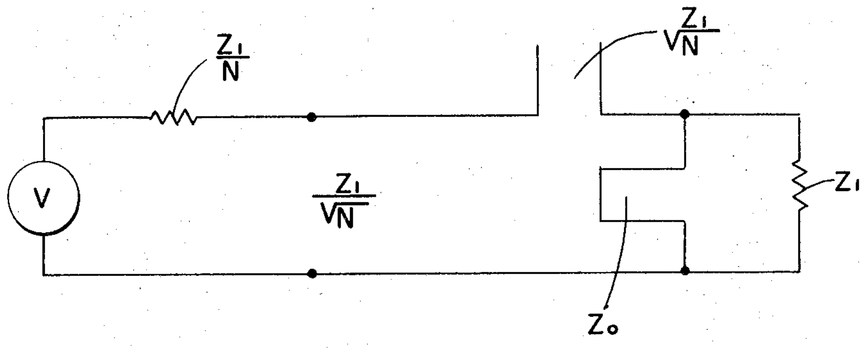
FIG. 2 is an illustration in schematic form of an equivalent circuit of one portion of the network of FIG. 1.

In FIG. 2 there is shown the equivalent circuit of one of the division channels of the power divider of FIG. 1. The input signal generator is illustrated as a voltage source V with its internal load impedance $Z_1/N$ as it appears to one channel. The basic section of transmission line is shown with a characteristic impedance of $Z_1/\sqrt{N}$ and is terminated in an impedance $Z_1$ with a shorted quarter wave stub across it. The second section of transmission line in the channel appears as an open ended quarter wave length section of transmission of characteristic impedance $Z_1/\sqrt{N}$. In general the values of these characteristic impedances will depend upon the desired operating characteristics. An impedance value of $Z_1/\sqrt{N}$ for both groups of lines is convenient to construct. Other values may provide, however, for a lower maximum VSWR.

The general calculations for the impedance values for the circuit of FIG. 1 are as follows:

$$VSWR=\frac{1+\frac{Z_{in}-Z_1}{Z_{in}+Z_1}}{1-\frac{Z_{in}-Z_1}{Z_{in}+Z_1}}$$

where $Z_1$ is the impedance of the terminating load; and $Z_{in}=1/Y_{in}$,
where $Y_{in}=1/3Z_3$ and $$Z_3=\frac{\frac{Z_2}{Z_c}+j\tan\phi}{1+j\frac{Z_2}{Z_c}\tan\phi}$$

where $Z_c$=characteristic impedance of the transmission lines in said first group $$\phi=2\pi l/\lambda$$

where $\lambda$=wave length
$l$=line length and $Z_2=P-jZ_4\cot\phi$
where $P=1/Q$ $Z_4$ is the characteristic impedance of the transmissions lines in the second group, and $$Q=\frac{1}{Z_1}-\frac{j\cot\phi}{Z_0}$$

where $Z_0$ is the characteristic impedance of the shorted compensating line sections across the output ports.

An alternate configuration may include a shorted quarter wave length line across the input port. One way to produce this effect is to remove some of the ferrite beads from the input transmission line sections. Alternatively a section of actual line may be used, where the characteristic impedance is the same as that of the output compensating lines.

For this configuration, $$Y_{in}=Y_b-\frac{j\cot\phi}{Z_0}$$

where $Y/_b=1/3Z_3$ and $Z_3$ is defined as above.

Values for VSWR, bandwidth and the characteristic impedances for both configurations are tabulated below in Table 1.

TABLE 1.—(N=3)

| VSWR | Bandwidth | $Z_c\Omega$ | $Z_4\Omega$ | $Z_0\Omega$ | Terminating resistors Ω |
|---|---|---|---|---|---|
| I. (without input shunt) | | | | | |
| 1.53 | 2:1 | 28.9 | 28.9 | ~180 | 17 |
| 1.15 | 2:1 | 28.9 | 75.0 | 46.0 | 112.5 |
| 1.40 | 3:1 | 28.9 | 45.0 | 65.0 | 40.5 |
| II. (with input shunt of $Z_0$) | | | | | |
| 1.10 | 3:1 | 27.5 | 55 | 74.7 | 66.7 |
| 1.35 | 3.7:1 | 24.8 | 49.7 | 58.7 | 66.7 |

It should be noted that with the circuit configuration of this invention, the value of the load impedance need not be varied as the power division factor goes up. The isolation remains virtually constant and the bandwidth for an acceptable VSWR decreases quite slowly, up to a division factor of ten or twelve.

Figure 3:
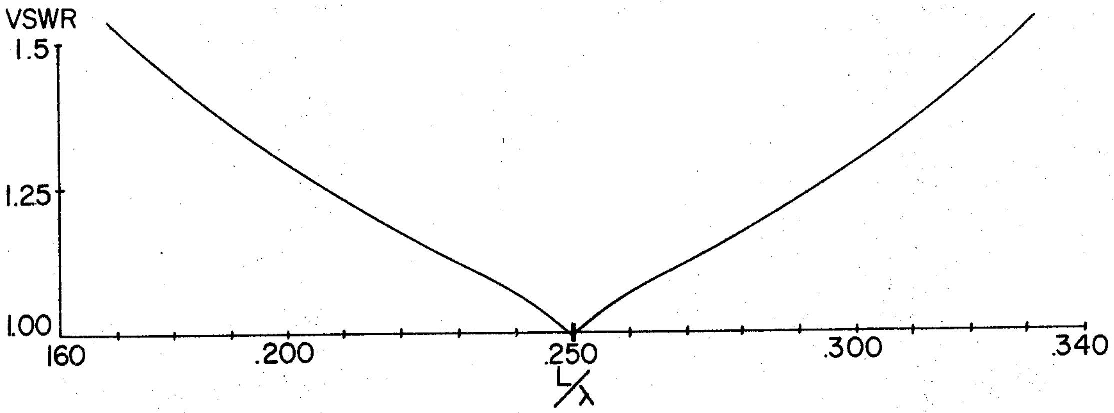
FIG. 3 is an illustration in graphical form of the standing wave ratio as a function of frequency for the circuit of FIG. 1.
Figure 4:
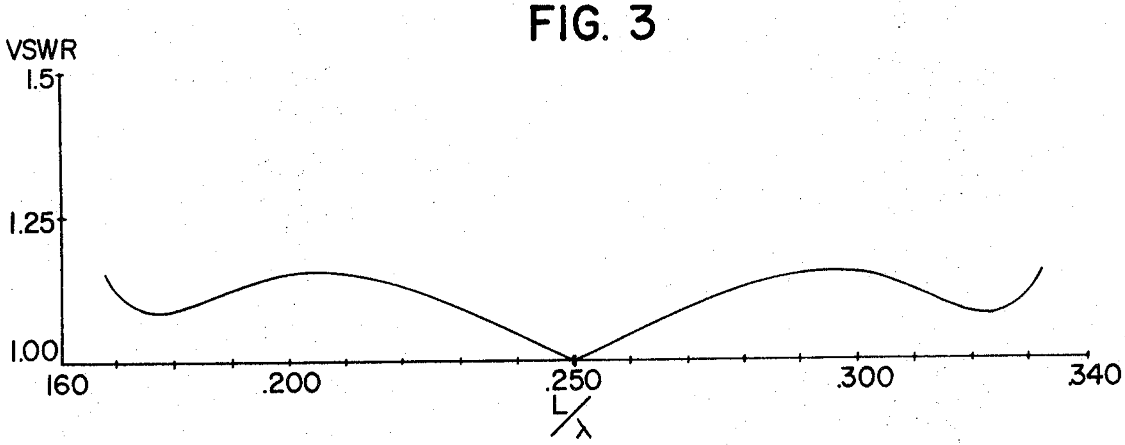
FIG. 4 is an illustration in graphical form of the standing wave ratio as a function of frequency for a circuit as in FIG. 1 for minimum VSWR.
Figure 5:
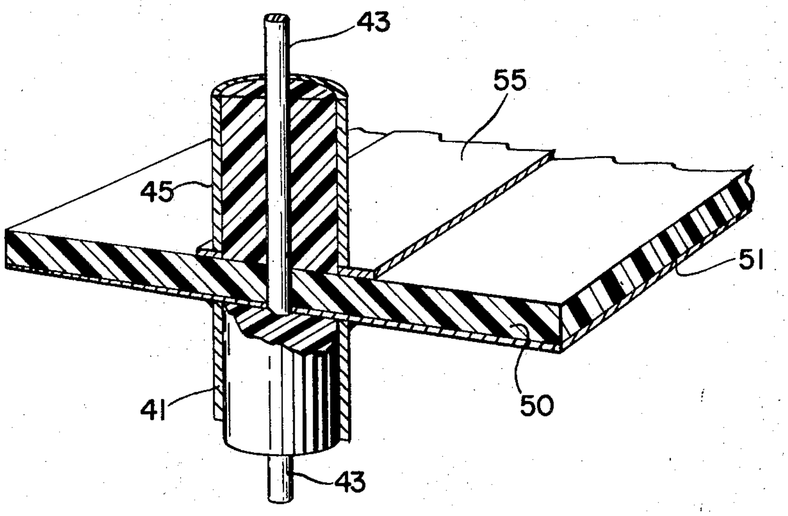
FIG. 5 is an illustration in cross-sectional view of one means of physically constructing a portion of the circuit of FIG. 1.

In FIG. 3 there is illustrated the standing wave ratio response of the circuit of FIG. 1 as a function of frequency, expressed in the ratio of length of the transmission line sections to wave length for the particular case where $Z_c=Z_4$. In FIG. 4 there is illustrated the same response curve for the circuit of FIG. 1 producing a minimum VSWR for 1 octave.

In FIG. 4 there is illustrated in cross sectional view a convenient construction arrangement for forming a portion of the divider network illustrated in FIG. 1. In FIG. 4, that portion of the divider network which includes the output port connection is shown. The output load is connected to the divider via a strip line 55 of characteristic impedance $Z_1$. The strip line is connected between a ground plane 51 and the outer conductor of a coaxial cable 45 which forms one of the second group of transmission lines (designated as 16, 18 and 20 in FIG. 1). A second coaxial cable 41 has its outer conductor 42 connected to ground plane 51 and this coaxial cable 41 is one of the first group of transmission lines (designated 13, 15 and 17 in FIG. 1). The center conductor 47 continues through both coaxial cables. The connectors are all supplied on a phenolic insulating board 50. With this configuration convenient connections may be made to each of the output ports.

The divider described herein may obviously be operated with higher division factors, odd or even, being limited only by bandwidth requirements.

I claim:

1. A radio frequency power divider operable over a predetermined band for dividing a radio frequency signal applied to an input port having an internal impedance $Z_1$ by a factor of N, providing said divided signal symmetrically at N output ports comprising, a first group of N transmission lines, each having a characteristic impedance identical to the other lines in said group and a length one quarter of the wave length at the middle of the band over which the divider is operable, the input ends of said first group of transmission lines being connected in series across a pair of terminals forming the input port of said divider, one conductor of each transmission line in said first group being connected to a point of potential reference at the end opposite the input ends;

a second group of transmission lines each having a characteristic impedance identical to the other lines in said second group and a length identical to that of the transmission lines in said first group, said second group of transmission lines being connected to said first group of transmission lines such that at a first end of each of the transmission lines in said second group, one conductor is connected through a load impedance having a value $Z_1$, forming said output port, to a point of potential reference, the other end of each of these conductors being connected directly to the point of potential reference, the second conductor of each of the transmission lines in said second group being connected at the first end directly to the non-grounded conductor of the corresponding one of said first group of said transmission lines and at the other end through a terminating impedance to a floating junction, the value of each of the terminating impedances for each of these second group of transmission lines being selected to isolate the output ports from one another.

each of said second group of transmission lines being positioned adjacent to a conductive surface connected to said point of potential reference, said first conductor of each of said second group of transmission lines forming with said conductive surface a third group of transmission lines having a length equal to those in said second group, thereby providing shorted transmission lines connected across said load impedances.

2. A radio frequency power divider in accordance with claim 1 wherein the characteristic impedance of said first group of transmission lines is $Z_1/\sqrt{N}$.

3. A radio frequency power divider in accordance with claim 2 wherein the characteristic impedance of said second group of transmission lines is equal to that of said first group and wherein said terminating impedances each have a value of $Z_1/N$.

4. A radio frequency power divider in accordance with claim 1 wherein each of the transmission lines in said first group has a ferrite bead surrounding it.

5. A radio frequency divider in accordance with claim 3 for providing three way power division wherein $Z_1$ is fifty ohms and wherein the characteristic impedance of each transmission line in said third group is substantially 180 ohms.

6. A radio frequency power divider in accordance with claim 1 wherein said conductive surfaces are the conductive sides of a casing enclosing the circuitry of said divider.

7. A radio frequency power divider in accordance with claim 2, wherein N is 3, wherein $Z_1$ is fifty ohms said second group of transmission lines has a characteristic impedance of 75 ohms; said third group of transmission lines has a value of 46 ohms; said terminating impedances each having a value of 112.5 ohms, whereby a maximum VSWR of 1.15:1 over a bandwidth of 2:1 is obtained.

8. A radio frequency divider in accordance with claim 1 and including a shunt shorted transmission line across said input port; said shunt line having length equal to the length of said first group of transmission lines and an impedance equal to that of said third group of transmission lines.

9. A radio frequency power divider in accordance with claim 8 wherein N=3; said first group of transmission lines have a characteristic impedance of 27.5 ohms; said said second group of transmission lines have a characteristic impedance of 55 ohms; said third group of transmission lines have a characteristic impedance of 74.7 ohms.

References Cited

UNITED STATES PATENTS 3,103,638 9/1963 Greuet ---------------- 339—9

HERMAN KARL SAALBACH, Primary Examiner

M. NUSSBAUM, Assistant Examiner

PO-1050
(5/69)

UNITED STATES PATENT OFFICE
CERTIFICATE OF CORRECTION

Patent No. 3,529,265 Dated September 15, 1970

Inventor(s) A. F. Podell

It is certified that error appears in the above-identified patent and that said Letters Patent are hereby corrected as shown below:

Column 2, line 28 change "parts" to --ports--

SIGNED AND
SEALED
NOV 24 1970

(SEAL)
Attest:

Edward M. Fletcher, Jr.
Attesting Officer

WILLIAM E. SCHUYLER, JR.
Commissioner of Patents